Patented Aug. 27, 1946

2,406,652

UNITED STATES PATENT OFFICE 2,406,652

KETOLS FROM ISOPHORONES AND HOMOLOGUES THEREOF

Seaver A. Ballard, Berkeley, and Vernon E. Haury, El Cerrito, Calif., assignors to Shell Development Company, San Francisco, Calif., a corporation of Delaware No Drawing. Application April 28, 1941, Serial No. 390,744

3 Claims. (Cl. 260—586)

This invention relates to ketols from isophorone and homologues thereof, and to a novel method for their manufacture. More particularly, the invention is concerned with a method of preparing a colorless, crystalline isomer of diisophorone and with the product so obtained.

L. Ruzicka in Helvetica Chim. Acta 3, 781–792 (1920) reports that he obtained biisophorone by treating isophorone in diethyl ether with sodamide. It is stated the product was a yellow oil. We have recently discovered that diisophorone has valuable insecticidal properties and have described and claimed in our copending patent application, Serial No. 381,548, filed March 3, 1941, insecticidal compositions containing diisophorone. It has been found, however, that diisophorone prepared by Ruzicka's method has little practical utility in some insecticidal compositions because the product soon acquires a brownish color and a rancid odor. When used in fly spray, Ruzicka's product is unsatisfactory in such compositions since when the spray is utilized in household applications, it leaves stains and has an unpleasant odor.

It is therefore an object of the present invention to provide a method of manufacturing diisophorone whereby a substantially stable, colorless, crystalline isomer of diisophorone is obtained. A further object is to provide such a novel isomer of diisophorone. Another object is to provide a method of manufacturing crystalline ketols from homologous isophorones. A still further object resides in the crystalline homologous diisophorones prepared by the method. These and other objects of the invention will be apparent from the description of the invention given hereinafter.

We have now discovered that isophorone may be condensed to crystalline diisophorone by employing an alkali metal hydroxide as condensation catalyst. Any of the various alkali metal hydroxides such as lithium hydroxide, sodium hydroxide, potassium hydroxide, rubidium hydroxide, and cesium hydroxide may be used for this purpose. The catalyst may be utilized in a variety of forms. For example, the desired condensation reaction may be effected with the alkali metal hydroxide in the solid state as pellets, flakes, granules, or powder. If desired, solutions of the hydroxide may be employed such as an aqueous solution or a solution in other solvents such as alcohols like methyl alcohol, ethyl alcohol, isopropyl alcohol, etc. It is ordinarily desirable to use solutions of the hydroxide in concentrated form with at least 50 per cent hydroxide in the solution.

We have also found that alkali metal alcoholates catalyze the reaction to form the crystalline ketols although the alcoholates are a less preferred group of catalysts than the alkali metal hydroxides. Suitable alkali metal alcoholates for use in the process include such substances as sodium ethylate, potassium methylate, sodium isopropylate, lithium ethylate, sodium butylate, rubidium isoamylate, sodium amylate, etc.

The crystalline ketols of the invention are prepared from isophorone or homologues thereof. By homologues of isophorone, reference is made to homo-isophorones obtainable from ketones such as methyl ethyl ketone, methyl propyl ketone, methyl butyl ketone, methyl isobutyl ketone and the like. The homo-isophorones from these ketones will contain from 12 to 18 carbon atoms. For example, in the case of the homo-isophorones which are derivatives of methyl ethyl ketone, the compounds may be represented by the following structural formulas:

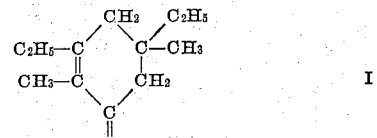

I

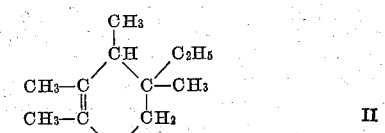

II

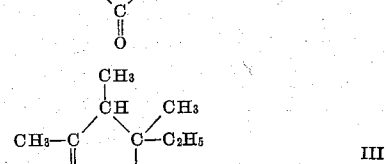

III

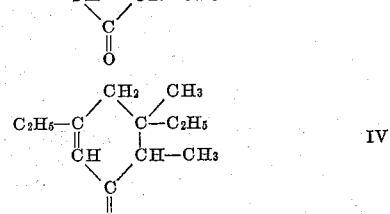

IV

Other reactants which may be used are homologous to the above compounds. A preferred group of reactants for use in the process are isophorone and the homologues thereof which contain the carbonyl group linked directly to a methylene group. Substances of the preferred reactants are exemplified by the compounds represented by Formulas I and II shown above. Although it is ordinarily desirable to use single compounds in the process, mixtures of isomers of the same number of carbon atoms or different number of carbon atoms may be employed, if desired.

The compounds of the invention, which are crystalline substances, are ketols. They contain both a carbonyl or keto group and a hydroxy group in addition to two olefinic or double linkages. The crystalline diisophorone obtained by the condensation reaction from isophorone may be represented by the general formula:

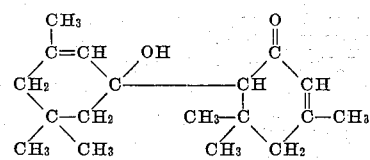

The crystalline ketols from the higher homoisophorones are of similar structure and homologous to the above-mentioned diisophorone. The diisophorone and higher ketols of the invention are very useful compounds. Besides being useful as insecticides, they may be used as bactericides and fungicides. In addition, they find a variety of other uses. They may be utilized to plasticize various resins and plastics. They may be employed as intermediates in the manufacture of numerous chemical compounds. For example, they may be hydrogenated to form glycols, reacted with aldehydes and ketones to give resins, sulfated and/or sulfonated to form detergent substances, etc.

In preparing the products of the invention, the reactant is heated in the presence of the alkali metal hydroxide condensation catalyst to effect the desired condensation reaction, the formed ketol is separated from the reaction mixture, and subsequently the ketol is purified by crystallization. The first step of the process is preferably effected at a temperature of from about 50° C. to 200° C. Ordinarily, it is desirable to conduct the condensation reaction at a temperature in the lower part of the preferred limits, say in the neighborhood of 100° C. The condensation reaction is a reversible reaction in which the lower the temperature, the more favorable is the equilibrium in the direction of the ketol. For example, at 100° C. equilibrium is reached when about 92 per cent isophorone is converted to crystalline diisophorone while at 150° C., equilibrium occurs with a conversion of about 71 per cent. However, temperatures too low are usually to be avoided since the reaction rate is markedly decreased with lowered reaction temperatures. For example, conversions of isophorone to diisophorone very nearly approaching the equilibrium value may be attained in ½ hour to 1 hour at 150° C. using powdered sodium hydroxide as catalyst. With a reaction temperature of 100° C., a time of 2 to 2½ hours is required to obtain a like result.

After the reaction, the ketol is separated from the reaction mixture. The preferred method is by distillation and because the formed ketol will revert back to the original reactant when heated during the distillation in the presence of the catalyst, it is desirable to remove the catalyst from the mixture of unreacted reactant and products prior to distillation. Removal of the catalyst may be made by neutralization with an acidic substance such as mineral acids. In the preferred embodiment, the catalyst is removed by washing the reaction mixture with water. When high conversions to the ketol are obtained, the crystalline product in the mixture may be large, making efficient removal of the catalyst difficult. In such cases, the mixture may be dissolved in a suitable solvent and the resulting solution washed until substantially free of catalyst. The lower, normally liquid hydrocarbons are suitable for this purpose, such as the pentanes, hexanes, octanes, benzene, gasoline, etc.

Following removal of the catalyst, the mixture is subjected to distillation. When a solvent is employed in the step of removing the catalyst, the solvent may first be stripped from the mixture and the stripped mixture then distilled to recover unreacted reactant and separate a fraction containing the crystalline ketol. The distillation of the stripped mixture is preferably made in vacuo at a pressure of 10 mm. of mercury or less to avoid decomposition at higher temperatures necessary with higher pressures.

The fraction containing the crystalline ketol ordinarily contains colored by-products of the condensation reaction which may be removed by subjecting the fraction to crystallization. The fraction is dissolved in hot solvent such as a lower normally liquid hydrocarbon or a lower alcohol such as ethyl alcohol, isopropyl alcohol, butyl alcohol, etc., and the resulting solution is cooled to crystallize the ketol. The crystals may be separated from the mother liquor by filtration, centrifugation, etc. and the crystals dried by any suitable known method. This step of the process purifies the product and may be repeated, if desired, to obtain further purification of the product.

In the preferred method of executing the process of the invention, isophorone or a homologue thereof containing the carbonyl group linked directly to a methylene group is heated at about 100° C. in a reactor with 1 to 3 per cent of powdered alkali metal hydroxide while the mixture is vigorously stirred. The mixture is then dissolved in a mixture of octanes and the catalyst washed therefrom with water. After removal of the catalyst, the mixture is stripped of the solvent and distilled under a pressure of about 2 mm. of mercury to separate a fraction containing the desired ketol. This fraction is then dissolved in a heated mixture of octanes, the mixture cooled to crystallize the product, and the crystals centrifuged for removal of the mother liquor. The crystals so obtained are again dissolved in the solvent, crystallized, and centrifuged. Finally, the residual mother liquor remaining on the crystals is removed by vacuum evaporation to produce the product in a colorless, crystalline state.

For the purpose of further illustrating the invention, a few examples are given, but it is to be understood that these are in no way to be construed as limitative.

*Example I*

Isophorone was condensed to crystalline diisophorone with the aid of an aqueous solution containing about 60 per cent sodium hydroxide. The reactant and the catalyst solution were placed in a nickel kettle fitted with a reflux condenser and a mechanical stirrer. The ratio by weight of the isophorone to caustic solution was approximately 4 to 1. The reaction mixture was heated at about 145° C. for 1½ hours with stirring during which time practically no distillate was formed. Upon cooling, the caustic solidified and the condensate was removed by decantation.

The decanted material was washed with water to remove entrained sodium hydroxide and distilled under a pressure of about 1-2 mm. The distillate containing the diisophorone was separated as a fraction, the crystalline isomer of diisophorone crystallizing therefrom on standing.

The diisophorone was obtained in a colorless, crystalline state upon being recrystallized from alcohol. About 61 per cent of the isophorone was converted of which, by weight, 83½ per cent was diisophorone, 10½ per cent was higher products and 6 per cent was water.

*Example II*

About 150 grams of isophorone were heated in a flask to about 150° C., and approximately 1.5 grams of powdered sodium hydroxide were added. The reaction mixture was stirred and heated to maintain the temperature substantially constant for about 1½ hours. The mixture was then washed with water to remove the sodium hydroxide after which it was steam distilled to separate the unreacted isophorone. Crystalline diisophorone separated from the residue. About 67 per cent of the isophorone was converted to diisophorone.

*Example III*

About 46 grams of metallic sodium were dissolved in 600 cc. of absolute ethanol. About 276 grams of isophorone were added to this mixture and the whole was heated under reflux at 70–80° C. for approximately 20 hours. The reaction mixture was then poured into water, washed with water until neutral, and distilled in vacuo under a pressure of about 1½ mm. The fraction containing the diisophorone was recrystallized from octanes and the diisophorone found to be identical with that obtained by condensation with sodium hydroxide.

*Example IV*

Diisophorone was prepared by a continuous method of condensation of isophorone. A mixture of octanes was used to azeotropically distill the small amount of water from the reaction mixture which is produced by side reactions. The original charge consisted of about 3700 grams of isophorone, 200 cc. of octanes and 370 grams of sodium hydroxide pellets. This mixture was placed in a vessel fitted with a stirrer and means for removing the water and octanes azeotrope. The reaction mixture was heated to about 160° C. and maintained at this temperature during the course of the run. A mixture of about 95.5 volume per cent isophorone and 4.5 volume per cent of octanes was continuously introduced into the reaction vessel at a rate permitting the average contact time to be approximately 1½ hours. The reaction mixture was withdrawn continuously from the reaction vessel so as to maintain the quantity of material in the vessel substantially constant. After withdrawal, the mixture was permitted to cool slowly to room temperature. The conversion of isophorone in periods of 63 minutes was as follows:

| Period | Per cent conversion |
| --- | --- |
| 1 | 80 |
| 2 | 81 |
| 3 | 80 |
| 4 | 80 |
| 5 | 83 |

The crystalline diisophorone was obtained from the reaction mixture by washing the mixture with water, distilling the unreacted isophorone and ketol therefrom at reduced pressure and crystallizing the desired product from the distillate boiling at 130–150° C. at 2 mm. pressure.

Some properties and analytical results obtained with the crystalline diisophorone prepared according to the process of the invention are listed below:

| | |
| --- | --- |
| Appearance | Colorless prisms |
| Melting point, °C | 83.5–84.5 |
| Carbon, per cent | 78.19 |
| Theoretical | 78.25 |
| Hydrogen, per cent | 10.28 |
| Theoretical | 10.14 |
| Carbonyl value | 0.37 |
| Theoretical | 0.36 |
| Molecular weight | 286 |
| Theoretical | 276 |
| Double bonds per molecule (Br$_2$ in CCl$_4$) | 2 |

*Example V*

Isophorone was condensed according to the method of Ruzicka, Helv. Chim. Acta 3, 781–792 (1920) and the semicarbazone was prepared from the diisophorone obtained. The semicarbazone of the diisophorone produced by the method of the invention was also prepared. Some comparative properties of the two derivatives are listed below:

| Method of preparation of diisophorone | NaOH condensation | NaNH$_2$ condensation |
| --- | --- | --- |
| Carbon, per cent | 68.51 | 68.33 |
| Hydrogen, per cent | 9.42 | 9.42 |
| Nitrogen, per cent | 12.4 | 12.3 |
| Melting point, °C | 205–208 | [1] 213–218 |

[1] Ruzicka reports a melting point of 215° C. for the semicarbazone. The two diisophorones prepared by the NaOH condensation and the NaNH$_2$ condensation were found to possess the same empirical formula, C$_{18}$H$_{28}$O$_2$, but were different isomers as is evident from the difference in melting points of the semicarbazones and the further fact that we found that a mixture of the two semicarbazones gave a melting point of 190–193° C. It was also found that the diisophorones prepared by Ruzicka's method soon discolored to a brownish color and acquired a rancid odor which behavior was decidedly different from the diisophorone obtained by NaOH condensation.

It was also found that the diisophorone prepared by condensation in the presence of sodium hydroxide yielded as 2,4-dinitrophenylhydrazone which melted at 186–187° C.

This application is a continuation in part of our copending application, Serial No. 381,548, filed March 3, 1941.

We claim as our invention:

1. Diisophorone having the general formula:

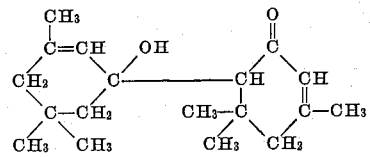

2. Crystalline diisophorone with a melting point of 83.5–84.5° C., and yielding a semicarbazone with a melting point of 205–208° C.

3. A colorless crystalline dimeric ketol of a compound from the group consisting of isophorone and higher homo-isophorones which homo-isophorones contain 12 to 18 carbon atoms in multiples of three and have the carbonyl group linked directly to a methylene group.

SEAVER A. BALLARD.
VERNON E. HAURY.